May 6, 1969 A. J. KRABAL 3,441,970

RECEPTACLE CLEANING DEVICE

Filed March 14, 1967 Sheet 1 of 2

INVENTOR.
ANTHONY J. KRABAL
BY
CAROTHERS & CAROTHERS
HIS ATTORNEYS

INVENTOR.
ANTHONY J. KRABAL
BY
CAROTHERS & CAROTHERS
HIS ATTORNEYS

United States Patent Office 3,441,970
Patented May 6, 1969

3,441,970
RECEPTACLE CLEANING DEVICE
Anthony J. Krabal, Pittsburgh, Pa., assignor to Brush Manufacturing Co., Inc., New Kensington, Pa., a corporation of Pennsylvania
Continuation-in-part of application Ser. No. 526,019, Feb. 7, 1966. This application Mar. 14, 1967, Ser. No. 622,991
Int. Cl. B08b 9/02; A46b 15/00; A47l 17/08
U.S. Cl. 15—114           10 Claims

ABSTRACT OF THE DISCLOSURE

A receptacle cleaning device for submerged use in a sink well filled with a washing solution and having a receptacle receiving cage composed of cage sections which retain a circumferential brushing means surrounding a centrally located brush with biasing means continuously imposed on the cage circumferential brushing means to urge the same inward toward the centrally located brush especially upon separation of the cage sections caused by insertion of a receptacle in the receptacle receiving cage for washing.

CROSS REFERENCE TO RELATED APPLICATIONS

This application is a continuation in part of my original application Ser. No. 526,019, filed on Feb. 7, 1966, now abandoned.

BACKGROUND OF THE INVENTION

This invention relates generally to a receptacle cleaning device and more particularly to a cleaning device submerged in a sink or tub filled with a washing solution into which a receptacle, such as a glass, vase, or tumbler, is inserted and rotated or reciprocated by hand to clean the interior and exterior surfaces of the receptacle and rid the same of stains, such as lipstick marks, etc. A centrally located brush is provided in the device to clean the interior of the receptacle and the outside of the receptacle is cleaned by a circumferential type brushing means which wipes the exterior of the receptacle as the same is rotated or reciprocated on the centrally located brush.

Receptacle cleaning devices are well known in the art and have their principal application in business establishments such as restaurants, cafes, taverns, etc. They provide the operator of such establishments a quick efficient convenience in cleaning receptacles which have been used by customers, especially in those cases where only one individual is available to serve customers and at the same time must have on hand a ready supply of glasses for customer use. Not only do such devices provide for a better "behind the counter" operation but also thoroughly clean such receptacles including stains and other foreign matter that may be present on the surfaces of the receptacle.

Prior receptacle cleaning devices are either operated by hand or may be operated electrically. In the latter case, the centrally located brush is usually rotatably driven by an electrical motor and in other cases the circumferential brushing means may be interconnected mechanically with the central brush drive and rotated in an opposite direction to bring about a scrubbing action against both the interior and exterior surfaces of the receptacle.

Such electrically operated cleaning devices present the possibility of hazardous electrical shock since these receptacle cleaning devices are always present in an environment of washing solution. Furthermore, such electrically operated cleaning devices, after they have been installed, are in many cases never used electrically by the user, since the brushes generally rotate faster than necessary and, thus, the rotating bristles of the cleaning brushes are discomforting on the hands of the user. Also electrical operation actually increases the time required to clean each receptacle since additional time is required to electrically operate the device as well as to place and remove receptacles from the fast rotating brushes. As a result, most owners of such electrically operated cleaning devices do not use them electrically at all, but rather merely clean receptacles by manually using the brushes provided in the cleaning device.

An example of receptacle cleaning device of the hand operated or manual type is Patent No. 2,506,075. In its cleaning operation the cleaning action provided by the brushes is predicated on the downward force manually applied by one's hand on the receptacle when the latter is inserted in the glass cleaning device. Thus use of this cleaning device is always dependent on sufficient pressure applied on the receptacle in order to insure proper washing of the glass.

SUMMARY OF THE INVENTION

The principal object comprising this invention is the provision of a receptacle cleaning device having a receptacle receiving cage which may be composed of a plurality of cage sections which retain a circumferential brushing means and provide a continuous biasing tension on the brushing means to urge the same inwardly toward the central brush of the receptacle cleaning device. Thus, a constant tensioning may be placed uniformly on circumferentially disposed brushing means to uniformly engage a receptacle placed over the central brush and provide proper and adequate wiping pressure to the sides of receptacle, as the same is rotated or reciprocated on the brush, to insure cleaning of receptacle of any foreign matter on the receptacle.

Another object of this invention is the provision of biasing means on the circumferential brushing means in the form of spring means or the utilization of the resiliency in the material used for the construction of the receptacle receiving cage per se.

Another object comprising this invention is the provision of an inexpensive brush cleaning device having no moving parts requiring maintenance and yet performs its cleaning function in a manner superior to those devices present in the prior art. This cleaning function may be performed solely by reciprocatory motion of the receptacle on the central brush; rotary motion of the receptacle on the central brush is not necessary to insure prior cleaning of the receptacle.

Another object comprising this invention is the provision of vertical and horizontal series of arcuately disposed projections on the inner surfaces of the circumferential brushing means which are flexible to provide a brushing or scrubbing action on the exterior surfaces of a receptacle to be cleaned.

Other objects and advantages of this invention appear hereinafter in the following description and claims.

The accompanying drawings show, for the purpose of exemplification without limiting the invention or the claims thereto, certain practical embodiments illustrating the principles of this invention wherein:

Figure 1:
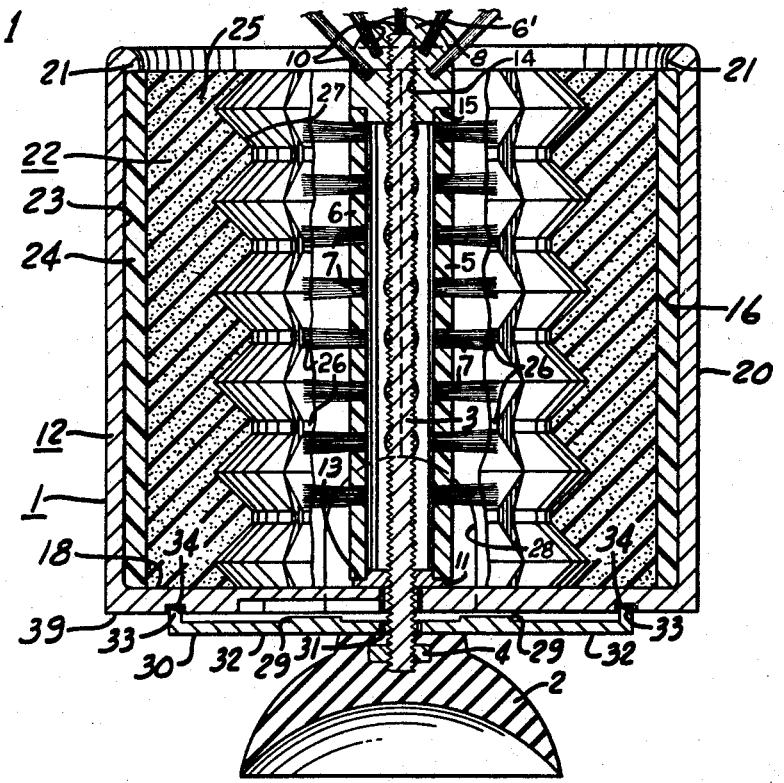
FIG. 1 is a cross-sectional view of the preferred embodiment comprising this invention.

Referring now to the drawings and more particularly to FIG. 1 there is shown the receptacle cleaning device 1 having a base 2 to support the standard 3. The base may be made of rubber or other suitable resilient material to perform the function of a suction cup so that device 1 may readily be detachably secured to the flat bottom surface of a sink, washing well or the like. The standard 3 is threaded to be received by the nut 4 embedded and molded within the base 2.

The standard 3 supports the central bristle brush 5 and comprises a bristle holder 6 which may be constructed of any suitable material such as plastic, for example, polyethylene. For convenience of illustration, the brush bristles arde shown at 6'. The bristle holder 6 is provided with a series of apertures 7 in its cylindrical body to each support tufts of bristles. The cap member 8 of the bristle holder 6 is also provided with openings 10 to each support tufts of bristles to aid in cleaning the interior bottom of the receptacle to be applied to the central brush 5.

As shown in FIG. 1, the nut 11 is threadably secured at the lower portion of the standard 3 to secure the receptacle receiving cage 12 into position and also provide an annular seat 13 for one end of the bristle holder 6. The cap member 8, which comprises a part of the central brush 5, has a threaded opening 14 which threadably receivies the upper end of the standard 3 to seat the bristle holder 6 on the seat 15 as well as the seat 13 and tightly secure these various parts in fixed relation. The removable cap member 8 permits the changing of the central brush 5 when the brush bristles become excessively worn.

The receptacle receiving cage 12 consists of a plurality of cage sections and in FIG. 1 there is shown two cage sections 16, which are structurally identical, to form a complete cage. Each cage section 16 is provided with a base 18 having an upwardly extended arcuate side wall 20, the upper end of which is formed with perimetral lip 21. The lip 21 aids in retaining the circumferential brushing means 22 in position against the inner surface 23 of the cage sections 16. The brushing means 22 comprises a base 24 of stiff plastic material, such as neoprene, to which is secured the sponge brushing portion 25. The base 24 is of stiffer material than the sponge brushing portion 25. The sponge brush 25 is provided with a series of arcuately disposed projections 26 on the inner surface 27 of the brushing portion 25 which are flexible to provide a wiping and scrubbing action on a receptacle inserted in the cleaning device 1.

The openings 28 may be provided at the bottom and lower side portion of each cage section 16 to permit the washing solution to leave the device 1, especially caused by the reciprocation of a receptacle on central brush 5. This causes turbulent action in washing solution and carries away foreign matter scrubbed from the washed receptacles out of the interior of the receptacle receiving cage 12.

As shown in FIG. 1, the yoke 30 has a central opening 31 to be slidably received on the standard 3 and is secured between the base 2 of the cleaning device 1, and the cage section bases 18 upon downward tightening of the nut 11 on the standard 3. The yoke 30 has two arms 32, the ends of which have the shoulders 33 to be engaged in the slots 34 in each cage section base bottom 39. Thus if three or more cage sections were utilized in constructing a receptacle receiving cage 12 comprising this invention, one or more additional arms 32 with shoulder 33 would have to be provided symmetrically around the opening 31. Thus, if four interlocking cage sections were utilized, a yoke 30 in the form of a cross (+) would be employed.

The primary function of the yoke 30 is to retain together the cage sections 16 in proper relative positions on the standard 3. At the same time the yoke 30 will also provide biasing means to urge the cage sections inwardly upon the application of any outwardly directed force on the cage sections such as that which results upon insertion of a receptacle over the central brush 5. Thus, the arms 32 of the yoke 30 function in the manner as leaf springs.

The yoke 30 is provided also with the upwardly extending projections 29 to engage the bottom of the bases 18 upon separation of the cage sections 16 to provide not only additional tension at these intermediate points on the cage section base bottom 39 but also uniformly distribute the tension thus applied by yoke 30 to the receptacle receiving cage 12.

Figure 4:
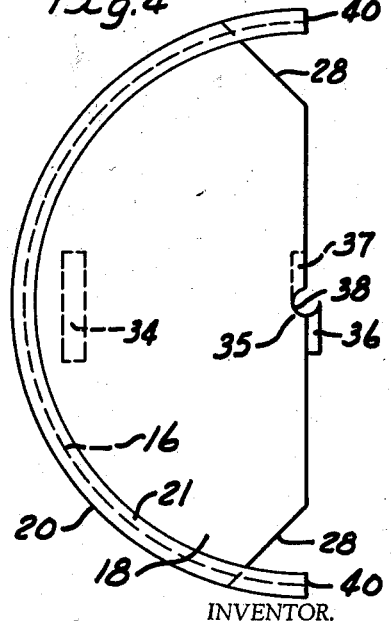
FIG. 4 is a plan view of a modified form of a cage section for use with the receptacle cleaning device comprising this invention.

The use of the yoke 30, per se, is not necessary to provide biasing means to urge inwardly the cage sections 16 toward the standard 3. The bases 8 of the cage sections may be provided with an interlocking structure to provide the biasing function necessary to permit the working surfaces 27 of the brushing means 22 to be inwardly urged on the surfaces of the receptacle to be cleaned. As shown in FIG. 4, the base of the receptacle cage section 16 is provided with a base 18 having an interlocking yoke 35 composed of the lip 36 and the mating pocket 37, both adjacent to the opening 38. Each of the cage sections 16 being identical counterparts, the corresponding lip 36 of another cage section 16 will fit into the pocket 37 with co-alignment of the openings 38. The side walls 20 of the assembled cage sections engage at 40 to provide a completed receptacle receiving cage. Upon clamping the cage sections 16 together by means of the nut 11, the interlocking yokes 35 are held in fixed interlocked relation and the yokes 35, one on the other, provide the necessary biasing means to urge the cage sections together inwardly toward the standard 3 upon the application of outwardly directed pressure against the side walls 20 caused from the insertion of a receptacle into the receptacle receiving cage.

The cage section bases 18 may be disposed at an acute angle, that is, at an angle slightly less than ninety degrees, relative to the side walls 20 in order to accentuate the biasing condition desired. The cage sections 16, being made of resilient material, will be placed in a state of constant tension with the cage section end walls 40 in abutting contact to provide an effective biasing means.

Figure 3:
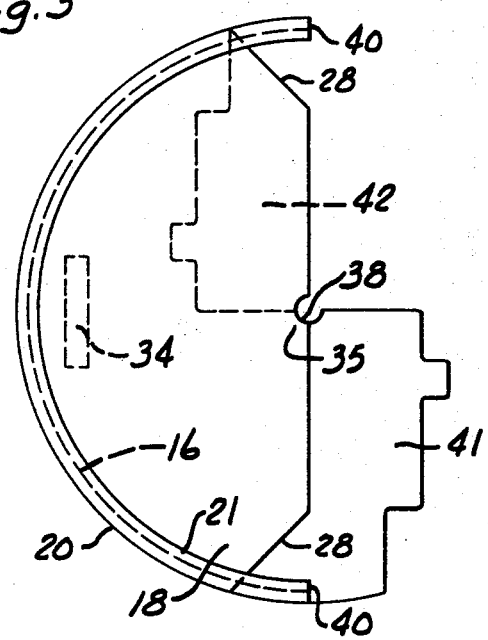
FIG. 3 is a plan view of the section shown in FIG. 2.
Figure 2:
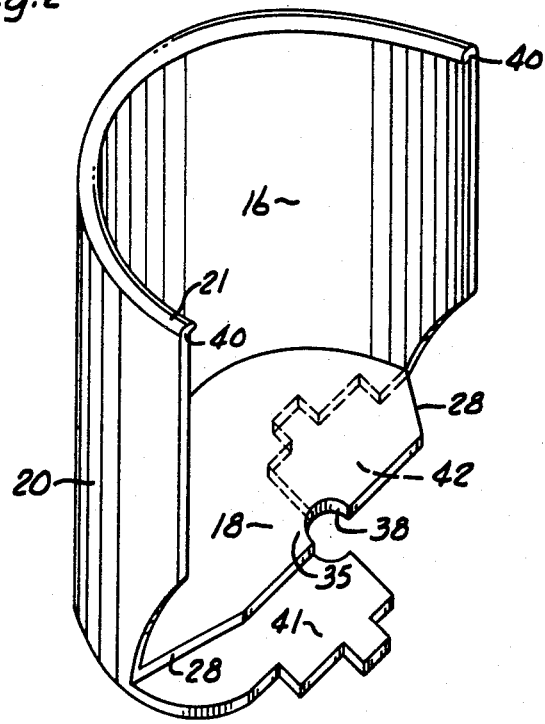
FIG. 2 is a perspective view of a cage section in the receptacle cleaning device comprising this invention.

In FIGS. 1, 2 and 3 there is shown a cage section structure similar to that of FIG. 4 except there is provided the tongue members 41 to be received in a corresponding pocket 42 of an oppositely positioned cage section 16. The tongue members 41 not only provide additional interlocking for the yokes 35 but also act as a leaf spring to provide additional biasing means to repel the outwardly directed separation of the walls 20 away from the standard 3.

It should be noted that the openings 38 in the interlocking yokes 35 are arcuate and have an arcuate extent greater than 135 degrees. Thus, the cage sections 16 are retained on the standard 3 and cannot readily be removed radially therefrom since the arcuate extent of the openings 38 surround a substantial portion of the standard 3. However, in this connection, yoke 30 provides additional security as a bracket to embrace the cage sections to unite them in their relative co-operative positions.

Figure 5:
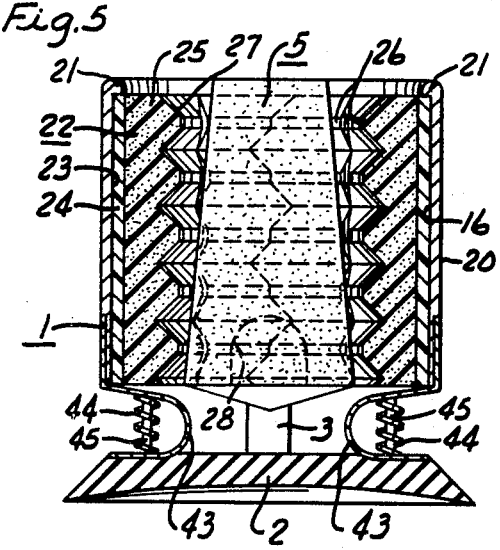
FIG. 5 is a cross-sectional view of another embodiment of the receptacle cleaning device comprising this invention.

FIG. 5 is a modification of the receptacle cleaning device of FIG. 1 wherein the biasing means to retain the cage sections inwardly relative to the standard 3 is supplied by the spring members 43 which are secured at one end to the base 2 and at the other end to the walls 20 of the cage sections 16. Additional biasing means may be provided by the springs 44 on the fasteners 45 which secure the spring members 43 to the base 2.

Figure 6:
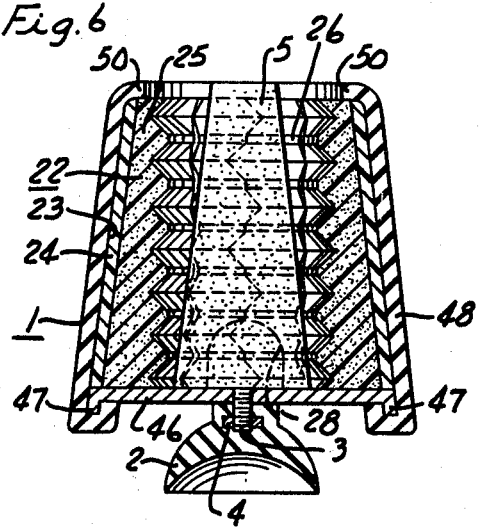
FIG. 6 is a cross-sectional view of still another embodiment of the receptacle cleaning device comprising this invention.

FIG. 6 is still another form of the receptacle cleaning device comprising this invention wherein the base 46 of the receptacle receiving cage 12 is a solid disc member having the annular lip 47 to which is secured the cage wall 48.

The cage wall 48, being of resilient material, such as rubber, is circumflexed over the lip 47 and may be cemented into position. The cage wall 48 is made in a frustoconical form with an annular perimetral lip 50 at its upper end to encircle and circumjacent the upper ends of the circumferential brushing means 22. The resilient cage walls 48 must actually be stretched to receive the brushing means 22 and, with the aid of the lip 50, not only retains the brushing means 22 within the receptacle receiving cage 12 but also provides biasing means. The cage wall 48 being flexed to receive the brushing means 22, is maintained under continuous tension by the same. Thus, the cage wall 48, in a state of tension, biasly urges the working surface 27 of the brushing means 22 inwardly on the receptacle to be washed and cleaned.

I claim:

1. A receptacle cleaning device having a base, a vertical standard secured to said base, brush means on said standard, annular wall means secured relative to said base to form a receptacle receiving cage, an inwardly disposed perimetral lip on the upper edge of said annular wall means, cage brushing means retained in said cage by said lip and annularly disposed against the inner surfaces of said annular wall means, and biasing means to urge said cage brushing means inwardly toward said standard.

2. The receptacle cleaning device of claim 1 characterized in that said annular wall means is of resilient material flexed to encircle and circumjacent the upper end of said cage brushing means to form the inwardly directed biasing means imposed upon said cage brushing means.

3. The receptacle cleaning device of claim 1 characterized in that said annular wall means are a plurality of cage sections each provided with a base having an opening therein for co-alignment with the openings in other cage sections to receive the standard, an upwardly extended arcuate side wall on each base of said cage sections to form a receptacle receiving cage to envelop said cage brushing means, said biasing means comprising spring means disposed on said first mentioned base to impose an inward biasing force independently on each of said cage section bases to cooperatively bias said cage sections inwardly toward said standard.

4. The receptacle cleaning device of claim 1 characterized in that said annular wall means are a plurality of cage sections each provided with a base having interlocking yokes with an opening therein for co-alignment with openings in other cage sections to receive said standard and an upwardly extended arcuate side wall on each cage section base to form a receptacle receiving cage, said biasing means imposed upon said cage brushing means comprising means to secure said receptacle receiving cage to said base and clamp said interlocking yokes to biasly urge said cage sections inwardly relative to said standard.

5. The receptacle cleaning device of claim 4 characterized in that said cage brushing means comprises vertical and horizontal series of arcuately disposed flexible projections on their inner surfaces.

6. The receptacle cleaning device of claim 4 characterized by a yoke centrally located on said standard between said base and said receptacle receiving cage to retain together and embrace said cage sections in their proper relative positions on said standard and to provide said biasing means to urge said cage sections inwardly relative to said standard.

7. The receptacle cleaning device of claim 1 characterized in that said annular wall means are a plurality of cage sections each provided with a base having interlocking yokes with an opening therein for co-alignment with openings in other cage sections to receive said standard and an upwardly extended arcuate side wall on each cage section base to form a receptacle receiving cage, each arcuate side wall formed at an angle slightly less than ninety degrees relative to said cage section base to provide said biasing means to urge said cage sections inwardly relative to said standard.

8. The receptacle cleaning device of claim 1 characterized in that said annular wall means are a plurality of cage sections each provided with a base having interlocking yokes with an opening therein for co-alignment with openings in other cage sections to receive said standard, each cage section having a tongue member protruding therefrom adjacently of said interlocking yoke, a pocket in each cage section base in opposite opposed relation to said tongue member relative to said interlocking yoke to receive the tongue member of a corresponding cage section, an upwardly extended arcuate side wall on each cage section base to form a receptacle receiving cage, said biasing means imposed upon said cage brushing means comprising means to secure said receptacle receiving cage to said base to clamp said interlocking yokes with corresponding tongue members in their corresponding pockets to biasly urge said cage sections inwardly relative to said standard.

9. The receptacle cleaning device of claim 8 characterized by a yoke centrally located on said standard between said base and said receptacle receiving cage to maintain together and embrace said cage sections and provide additional biasing to said in urging said cage sections inwardly relative to said standard.

10. The receptacle cleaning device of claim 9 characterized by shoulders on the ends of said yoke, an inward disposed slot in the bottom of each of said cage section bases to receive a corresponding shoulder of said yoke, and projections on said yoke intermediate of the ends thereof to engage said cage section bases upon retraction of said cage side walls away from said standard.

References Cited

UNITED STATES PATENTS 2,900,653   8/1959   Lamberton _____ 15—164

WALTER A. SCHEEL, *Primary Examiner.*

L. G. MACHLIN, *Assistant Examiner.*

U.S. Cl. X.R.

15—164, 211